United States Patent [19]
Balcarek et al.

[11] Patent Number: 5,827,972
[45] Date of Patent: Oct. 27, 1998

[54] HIGH PRESSSURE SENSOR APPARATUS WITH LOW COST COMPACT PACKAGING SYSTEM

[75] Inventors: Richard J. Balcarek, Taunton; Robert L. Bartosh, Attleboro; Robert P. Bishop, Pembrook; Bryan J. Dague, North Attleboro; Douglas B. Strott, Attleboro, all of Mass.; John M. Armacost, Slatersville, R.I.; Steven Beringhause, Norton, Mass.

[73] Assignee: Texas Instruments Incorporated, Dallas, Tex.

[21] Appl. No.: 146,868

[22] Filed: Nov. 2, 1993

[51] Int. Cl.⁶ .................................. G01L 7/00; G01L 9/00
[52] U.S. Cl. ................................. 73/756; 73/724; 73/718; 361/283.4
[58] Field of Search .............................. 73/756, 724, 726, 73/727; 29/621.1, 25.41; 338/4, 42; 361/283.1, 283.2, 283.3, 283.4

[56] References Cited

U.S. PATENT DOCUMENTS

| | | | |
|---|---|---|---|
| 4,425,799 | 1/1984 | Park ......................................... | 73/718 |
| 4,617,607 | 10/1986 | Park et al. ............................... | 361/283 |
| 4,716,492 | 12/1987 | Charboneau et al. . | |
| 4,774,626 | 9/1988 | Charboneau et al. . | |
| 4,875,135 | 10/1989 | Bishop et al. . | |
| 4,888,662 | 12/1989 | Bishop . | |
| 4,903,164 | 2/1990 | Bishop et al. . | |
| 4,918,833 | 4/1990 | Allard et al. .......................... | 29/621.1 |
| 4,982,351 | 1/1991 | Kawate et al. . | |
| 5,043,841 | 8/1991 | Bishop et al. ........................ | 361/283.4 |
| 5,060,108 | 10/1991 | Baker et al. . | |
| 5,174,158 | 12/1992 | Kremidas ............................... | 73/727 X |

*Primary Examiner*—Joseph L. Felber
*Attorney, Agent, or Firm*—Russell E. Baumann; Richard L. Donaldson; Rene' E. Grossman

[57] ABSTRACT

A fluid pressure sensor particularly useful for measuring pressure up to approximately 2000 psi has a hexport (12, 112, 212, 312) formed with a stop surface (26, 326) in a bottom wall (18) circumscribing a fluid pressure inlet (16). A pressure sensing module (22) is received on the stop surface and a distal end (40) of a wall (20, 120, 320) of the hexport is crimped to lock the pressure sensing module onto the stop surface with the stop surface limiting the amount of compression of an O-ring (30) disposed contiguous to and inboard of the stop surface. In one embodiment the crimp is placed directly on a metal ring (38) attached to a plastic connector (32) which in turn transfers the crimping force to the pressure sensing module. In other embodiments (FIGS. 2, 3) the crimp is placed directly in the pressure sensing module to form a subassembly. In one embodiment, a separate sleeve (142) member connects the subassembly to the plastic connector while in another embodiment the connector is provided with an extended skirt which snaps over the hexport to connect the connector to the subassembly. In yet another embodiment, the plastic connector (332) is formed with a strengthening flange (334) received around the pressure sensing module and the crimp is formed directly on the plastic connectors to reduce contact stresses in the crimp and compensate for crimp wall springback.

12 Claims, 2 Drawing Sheets

HIGH PRESSSURE SENSOR APPARATUS WITH LOW COST COMPACT PACKAGING SYSTEM

BACKGROUND OF THE INVENTION

This invention relates generally to fluid pressure sensors and more particularly to a low cost packaging system for fluid pressure sensors particularly adapted for use with fluid pressures in the range of 500 psi to 2000 psi or higher.

Pressure transducers comprising a pressure sensing module including an electronic circuit having a variable capacitor responsive to fluid pressures are known. Examples of such prior art transducers are described in U.S. Pat. Nos. 4,716,492; 4,774,626; 4,888,662; 4,875,135; 4,903,164; 4,982,351 and 5,060,108, assigned to assignee of the present invention. The electronic circuit senses the capacitance of the capacitor and provides an output through an electrical connector indicative of the sensed pressure. The transducer elements are arranged so that a metallic cup shaped housing having a fluid pressure inlet at one end thereof to receive fluid under pressure to be measured also includes therein the pressure sensing module. The pressure sensing module is spaced from the inlet by a compressible gasket or O-ring with the electronic circuit and connector suitably attached to the housing. In U.S. Pat. No. 4,875,135, the connector is formed of plastic material to which the housing is attached by crimping an upstanding wall of the housing over a flange portion formed on a lower distal end portion of the connector. The connector is adapted to transfer a force from the crimp through the pressure sensing module onto an 0-ring gasket disposed in the housing around the fluid pressure inlet to compress the gasket an amount determined by the crimp formed in the upstanding housing wall.

The above described pressure transducer provides highly satisfactory results when operated in the low to moderate pressure ranges of up to approximately 500 psi. However, when subjected to higher pressures the transducers tend to fail with one of the principle failure modes being related to a tendency of the gasket to extrude between the housing and the pressure sensing module due to distortion of the housing wall and/or the crimp resulting in seal failure and leakage. This problem has been effectively overcome by placing a relatively rigid back-up ring formed of material such as polytetrafluoroethylene in contact with the housing and the pressure sensing module around the less rigid O-ring to prevent it from partially extruding between the housing and the sensing module. Loading over time is stabilized by burning in all the elements of the transducer prior to calibration thereof to prevent changes due to cold flow and the like. Another modification useful in making a transducer capable of withstanding high pressure, involves the use of a support member disposed within the housing between the pressure sensing module and the connector with the upstanding wall of the housing crimped over both the support member and the plastic connector to hold them in place fixing the pressure sensing module securely within the housing. Such structure is shown in U.S. Pat. Nos. 4,903,164 and 4,888,662 referenced supra. Although such transducers are very effective for use with pressures of up to about 5000 psi, there is a need for a transducer useful in an intermediate range of pressures, for example, between 500 psi and approximately 2000 psi which is less expensive both in material and in assembly costs.

SUMMARY OF THE INVENTION

It is an object of the invention to provide a novel and improved pressure sensor; to provide such a sensor particularly adapted for use with intermediate pressure ranges, i.e., a range extending from 500 psi which can be met with low cost sensors as shown, for example, in U.S. Pat. No. 4,982,351, up to 2000 psi with less expensive and therefore economically feasible sensors compared to the more expensive devices shown, for example, in U.S. Pat. Nos. 4,888,662 and 4,903,164 used effectively for pressures up to 5000 psi or over.

Briefly, in accordance with the invention, a low cost pressure transducer suitable for use with intermediate pressures comprises a metallic housing or hexport formed with a cup shaped portion having a bottom wall through which a fluid inlet is formed with an O-ring seat formed in the bottom wall circumscribing the inlet and with a stop surface formed in the bottom wall adjacent the O-ring seat to provide a fixed positive reference controlling the amount of compression of the O-ring. The cup shaped portion of the hexport is formed with an upstanding wall having a distal end which is crimped over to apply an aligned stack-up of force through a pressure sensing module received on the stop surface directly to the stop surface. In one embodiment the distal end of the upstanding wall is crimped onto a metal ring attached to a plastic electrical connector body as by insert molding with the ring aligned with the stop surface providing an aligned force stack-up from the metal crimp, through the metal ring, pressure sensing module to the stop surface of the hexport. In second and third embodiments the distal end of the upstanding wall is crimped directly onto the top surface of the pressure sensing module forming a subassembly and again providing an aligned force stack-up from the metal crimp through the pressure sensing module to the stop surface of the hexport. In the second embodiment the plastic connector is attached to the subassembly with an O-ring environmental seal disposed around the outer peripheral joint between the crimp wall and the connector, by a metal sleeve crimped over a flange formed on the connector at one end of the sleeve and a lower flange formed on the hexport at the other end of the sleeve. According to a feature of the third embodiment the plastic connector is formed with an extended wall or skirt adapted to snap over the lower flange formed on the hexport and an environmental seal in the form of an O-ring is disposed on the outer peripheral surface of the hexport between the hexport and the extended wall of the connector. According to yet another embodiment, the plastic connector body is formed with a pressure sensor module seat having a wall extending downwardly a distance equal to a portion of the thickness of the pressure sensor module and the distal end of the upstanding wall of the hexport is crimped directly onto the plastic connector with an aligned force stack-up existing from the crimp through the seat portion of the plastic connector, through the pressure sensing module to the stop surface of the hexport.

BRIEF DESCRIPTION OF THE DRAWINGS

Other objects, advantages and details of the novel and improved pressure sensor of the invention appear in the following detailed description of the preferred embodiments of the invention, the detailed description referring to the drawings in which.

DETAILED DESCRIPTION OF THE PREFERRED EMBODIMENTS

Figure 1:
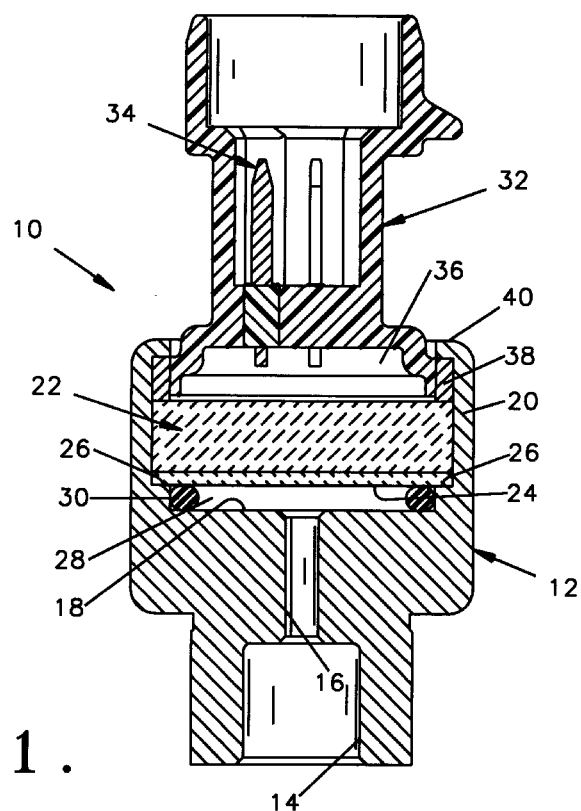
FIGS. 1–4 are cross-sectional views of several embodiments of sensors made in accordance with the invention.

Referring to FIG. 1 of the drawings, there is shown a pressure sensor 10 comprising a metal housing or hexport 12 having a fluid inlet 14 in fluid receiving communication with a bore 16 in a bottom wall 18 of the hexport. Hexport 12 is formed into a generally round cup shaped configuration having an upstanding wall 20 adapted to closely receive therein a pressure sensing module 22 having a pressure responsive surface 24. An annular ledge 26 extends upwardly a selected distance from bottom wall 18 adjacent wall 20 and serves as a stop surface on which pressure sensing module 22 is received. A pressure cavity 28 is formed between pressure responsive surface 24 and bottom wall 18. An O-ring 30 is disposed on bottom wall 18 on a seat adjacent ledge 26. The height of ledge 26 above bottom wall 18 relative to the height of the body portion of the O-ring is selected so that compression of O-ring 30 is limited to a selected fixed value when the pressure sensing module is mounted in hexport 12. It should be noted that sealing systems other than an O-ring, such as gaskets, lip seals and other resilient seals can be used.

Pressure sensing module 22 shown is a capacitive pressure transducer of the type shown in the above noted patents. However, it should be realized that other types of pressure sensing modules, such as piezoelectric or strain gauge, could be used in the pressure sensor made in accordance with the invention.

A connector 32 formed of suitable electrically insulating material, such as plastic, mounts a plurality of terminals 34, two of which are shown in the figure, extending into a circuit receiving cavity 36 for connection to a suitable circuit (not shown) disposed in the cavity. The circuit may take the form of a flex circuit employing soldered connections such as that shown in U.S. Pat. No. 4,875,135 referenced supra, a conventional circuit board employing socket connections or may be printed directly onto the pressure sensing module 22. A metallic ring 38 is attached to and circumscribes the lower portion of connector 32. Ring 38 may be insert molded with connector 32 using suitable interlocking passages formed in the ring or could be attached thereto in any suitable manner. Ring 38 adds rigidity to the lower end of the connector preventing distortion and serves as a component in the aligned direct force stack-up, as will be explained below, as well as allowing a convenient electrical connection from the circuit to hexport 12 to improve the sensor's electromagnetic compatibility (EMC).

Upon assembly, pressure sensing module 22 is biased down onto stop surface 26 thereby compressing gasket or O-ring 30 to an amount determined by the height of stop surface 26 above the O-ring seat, and distal end 40 of upstanding wall 22 is crimped over onto metallic ring 38 providing an aligned direct force stack-up through distal end 40, ring 38, the outer peripheral portion of sensing module 22 to stop surface 26.

Placing the pressure sensing module firmly on top of ledge 26 minimizes the possibility of a seal extrusion gap being formed thereby preventing seal extrusion. Pressure sensors not having such gap prevention means would fail prematurely if they were subjected to higher pressures of up to 2000 psi.

If desired, a suitable environmental seal such as RTV silicon can be placed between distal end 40 and connector 32.

Figure 2:
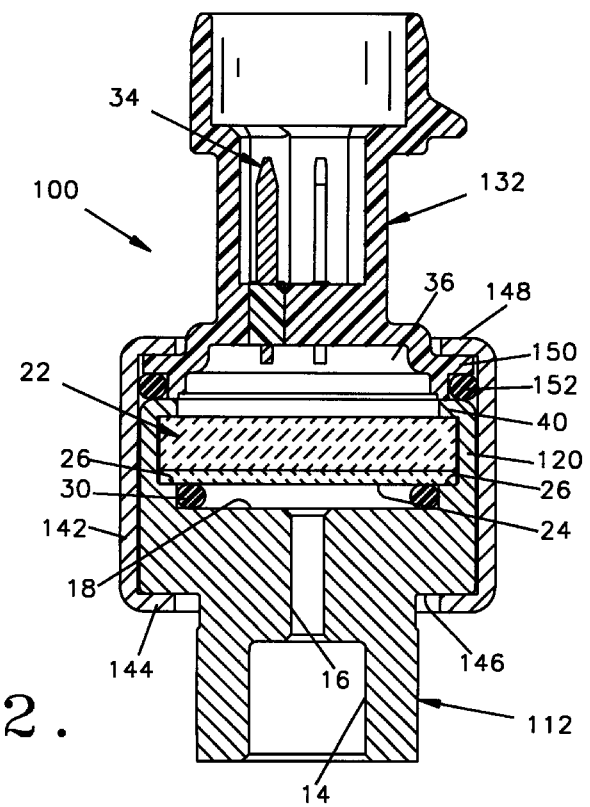

With reference to FIG. 2, a second embodiment of the invention comprises a sensor 100 having a hexport 112 similar to that of FIG. 1 but with wall portion 120 extending upwardly a shorter distance than that of wall 20, the distance being sufficient so that distal end 40 can be crimped directly onto pressure sensing module 22 forming a subassembly in which the pressure sensing module is fixedly attached to the hexport on ledge 26 providing the selected amount of compression on a resilient seal, such as O-ring 30, in the same fashion as in FIG. 1. In the FIG. 2 embodiment the aligned force stack-up extends from metal crimp 40 through pressure sensing module 22 directly to ledge 26.

Connector 132 can be conveniently attached after calibrating the sensor, for example, as disclosed in U.S. Pat. No. 4,875,135 referenced supra. The connector can be attached by means of a metal sleeve 142 which is crimped at 144 at one end of the sleeve to bottom surface portion 146 of hexport 112 forming a lower flange and at 148 at the other end of the sleeve to the top surface of radially extending flange 150 of connector 132. An environmental seal in the form of an O-ring 152 can be conveniently disposed between flange 150 and crimped distal end 40 of hexport 112 around the joint formed between the connector and the housing in order to prevent entry of contaminants into the circuit receiving cavity 36.

Figure 3:
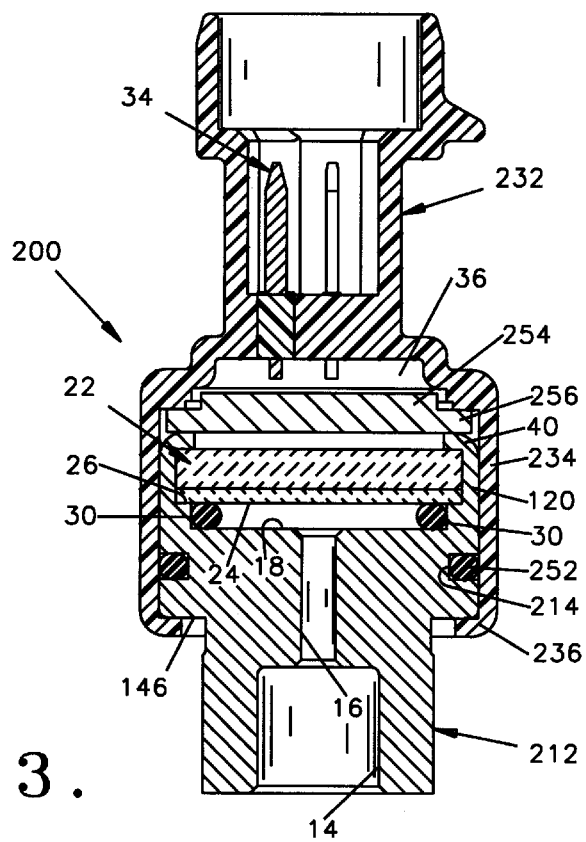

FIG. 3 shows another embodiment similar to that of FIG. 2 in that a subassembly is formed with distal end 40 of upstanding wall 120 crimped directly onto pressure sensing module 22 providing the same aligned force stack-up as the FIG. 2 embodiment. Connector 232 of sensor 200, shown in FIG. 3, is provided with a depending portion adapted to snap over a portion of hexport 212. As shown, a tubular skirt 234 is provided having a radially, inwardly extending lip 236 at its outer distal end which is adapted to snap over bottom surface portion, lower flange 146 to secure connector 232 to hexport 212. An annular groove 214 may be conveniently formed about the periphery of hexport 212 above bottom surface portion 146 for reception of an O-ring 252, or other resilient member, to form an environmental seal between the hexport and skirt 234. Alternatively, connector 232 could have, for example, a plurality of depending legs provided with inwardly extending lips adapted to snap over flange 146.

Sensor 200 is shown with a circuit board 254 disposed in circuit receiving cavity 36 with a flange portion 256 sandwiched between distal end 40 of upstanding wall 120 and connector 232. However, it will be realized that other circuit arrangements as discussed supra could be employed, if desired. As in the FIG. 2 embodiment calibration can conveniently be effected before connector 232 is attached. In both the FIGS. 2 and 3 embodiments an EMC connection can be conveniently made through distal end 40 crimped onto module 22.

Figure 4:
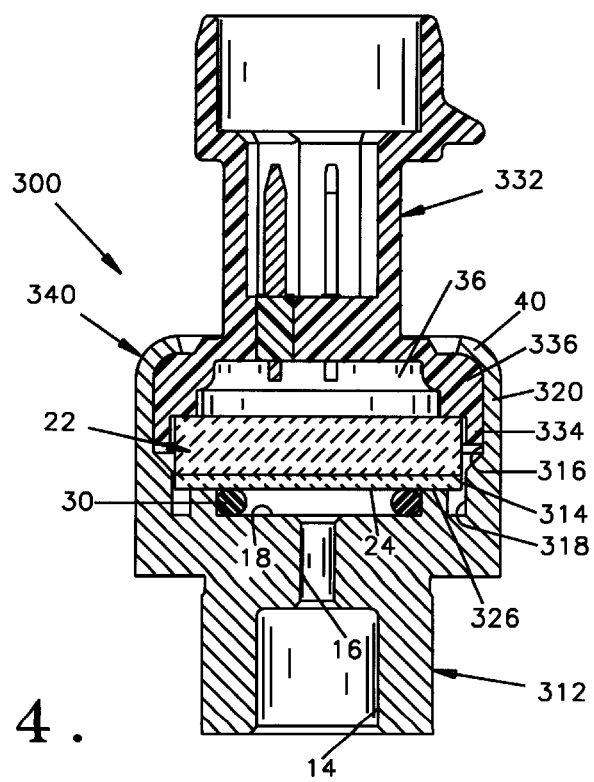

In FIG. 4, another embodiment of the invention is shown in which plastic connector 332 is formed with a flange 334 extending downwardly from shoulder portion 336 and adapted to receive the upper portion of pressure sensing module 22. Hexport 312 of sensor 300 is formed with a circular wall portion 314 which closely receives the lower portion of pressure sensing module 22 and which is cut away at 316 to accommodate flange 334 which closely receives the upper portion of module 22. Stop surface, ledge 326, is formed by a rib extending upwardly from bottom wall 18 of hexport 312 and, if desired, and as shown, may be spaced inboard of wall surface 314 to provide an even smaller pressure receiving surface 24 than in the FIGS. 1–3 embodiments and thereby decrease the force exerted on module 22 by fluid received in inlet port 14. Placing ledge 326 inboard of wall 314 also provides an undercut making the forming of the seat of pressure sensing module less critical. That is, wall 314 can be machined in such a manner that any radius formed at 318 would not interfere with module 22 in any way. It will be appreciated that ledge 26 of FIGS. 1–3 could also be placed inboard up the upstanding sidewall to provide an undercut to facilitate the forming of the pressure module seat.

Distal end 40 of upstanding wall 320 is crimped over onto the plastic shoulder 336 providing an aligned force stack-up comprising distal end 40, shoulder 336, the outer peripheral portion of module 22 and ledge 326. In the FIG. 4 embodiment the plastic shoulder 336 provides a more conforming backing for the crimping step resulting in lower and more evenly distributed contact stress being formed in crimped distal end 40. In addition, plastic shoulder 336 provides a more resilient backing for the crimp which automatically compensates for the wall springback inherent in the crimping process. With stress evenly distributed the tendency for the plastic, over time, to creep and possibly form a gap is minimized. The crimping forces place a resultant force indicated by arrow 340 on shoulder 336 directed inwardly and downwardly. Dimensional stability of shoulder 336 is enhanced by flange 334 which rigidifies the shoulder. If desired, an environmental seal of resilient material can be conveniently placed within circular wall portion 314 at cut away section 316 below flange 334. Connector 332 in this embodiment is formed of any suitable high strength resin such as Ultem or Noryl, both trademarks of General Electric for glass filled reinforced polyetherimide and polyphenylene oxide/nylon plastics, respectively having compression strengths of approximately 26,000 psi.

Sensors made in accordance with the invention are suitable for use with mid range pressures of up to approximately 2,000 psi yet do not require separate anti-extrusion elements such as the prior art polytetrafluoroethyene ring which is relatively expensive. Devices made with fewer parts are also less expensive to assemble.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed:

1. A pressure sensor comprising:
   a metallic housing having a bottom wall formed with a fluid pressure inlet in the bottom wall and having a sidewall extending upwardly from the bottom wall to a distal end,
   a pressure sensing module having a pressure responsive surface communicating with the fluid pressure inlet and disposed within the housing closely adjacent the upwardly extending sidewall, the upwardly extending sidewall circumscribing the pressure sensing module,
   an annular stop surface integrally formed as part of the bottom wall, the stop surface disposed a selected first distance above the remainder of the bottom wall, the pressure sensing module received on the stop surface,
   a seal formed of resilient material received on the bottom wall contiguous to and inboard of the stop surface, the seal formed of resilient material having a height of a second distance greater than the first distance whereby compression of the seal by the pressure sensing module is limited by the stop surface,
   the distal end of the upwardly extending sidewall being crimped inwardly to place a force on the pressure sensing module biasing the module against the stop surface, and
   a connector attached to the housing to provide electrical connection to the pressure sensing module.

2. A pressure sensor according to claim 1 in which the connector comprises an electrically insulative member mounting electrical leads through a bottom wall of the member, the member having an annular flange, a metallic annular element having a top surface and an inner surface, the inner surface being attached to the annular flange and the top surface being engaged by the crimped distal end of the sidewall of said metallic housing.

3. A pressure sensor according to claim 1 in which the crimped distal end of the sidewall of said metallic housing engages the pressure sensing module, the connector comprising an electrically insulative member mounting electrical leads through a bottom wall of the member, the member having an annular flange and further comprising a metallic sleeve having first and second ends, the sensor received within the sleeve with the first end of the sleeve crimped over the annular flange of the member and the second end of the sleeve crimped onto the metal housing to interconnect the connector and the housing.

4. A pressure sensor according to claim 3 further including a resilient seal disposed between the annular flange of the member and the crimped distal end of the upstanding sidewall.

5. A pressure sensor according to claim 1 in which the crimped distal end of the sidewall of said metallic housing engages the pressure sensing module, the connector comprising an electrically insulative member mounting electrical leads through a bottom wall of the member, the member having an annular flange with a skirt depending downwardly therefrom to a free distal end, an inwardly extending lip formed at the free distal end of the skirt, the lip being adapted to snap over a portion of the metal housing to interconnect the connector and housing.

6. A pressure sensor according to claim 5 further including a resilient seal disposed between the skirt and the metal housing.

7. A pressure sensor according to claim 1 in which the connector comprises an electrically insulative member mounting electrical leads through a bottom wall of the member, an annular shoulder integrally attached to the bottom wall of the member, the shoulder having a top surface and a bottom surface, the bottom surface engaging the pressure sensing module and the crimped distal end of the upwardly extending sidewall of the housing engaging the top surface of the shoulder.

8. A pressure sensor according to claim 7 in which the connector is composed of a reinforced resin.

9. A pressure sensor according to claim 7 in which the connector is composed of one of polyphenylene oxide/nylon and polyetherimide.

10. A pressure sensor according to claim 1 in which the pressure sensing module has a side wall extending between top and bottom surfaces, and in which the connector comprises an electrically insulative member mounting electrical leads through a bottom wall of the member, an annular shoulder integrally attached to the bottom wall of the member, the shoulder having a bottom surface engaging the pressure sensing module and an annular wall portion extending downwardly from the bottom surface over at least a portion of the side wall of the pressure sensing module.

11. A pressure sensor according to claim 1 in which the pressure sensing module is generally cylindrical having a bottom surface with a circular outer peripheral surface portion and the annular stop surface is aligned and engaged with the outer peripheral surface portion.

12. A pressure sensor according to claim 1 in which the pressure sensing module is generally cylindrical having a bottom surface with a circular outer peripheral surface portion and the annular stop surface is aligned and engaged with the bottom surface inboard of the outer peripheral surface portion.

* * * * *